June 11, 1957 J. R. MACDONALD 2,795,654

HIGH IMPEDANCE ELECTRONIC CIRCUIT

Filed March 2, 1954 2 Sheets-Sheet 1

INVENTOR.
James R. Macdonald
BY
Roland A. Anderson
ATTORNEY

June 11, 1957 J. R. MACDONALD 2,795,654

HIGH IMPEDANCE ELECTRONIC CIRCUIT

Filed March 2, 1954 2 Sheets-Sheet 2

INVENTOR.
James R. Macdonald
BY
Roland A. Anderson
ATTORNEY

United States Patent Office 2,795,654

Patented June 11, 1957

2,795,654

HIGH IMPEDANCE ELECTRONIC CIRCUIT

James R. Macdonald, Dallas, Tex., assignor to the United States of America as represented by the United States Atomic Energy Commission Application March 2, 1954, Serial No. 413,737

2 Claims. (Cl. 179—171)

The present invention relates to coupling circuits and more particularly to high impedance electronic circuits possessing a very high impedance ratio transformation for coupling very high impedance circuits with relatively low impedance circuits.

It is often desirable to have available a circuit which transforms a very high input impedance to a lower output impedance. For many purposes, an ordinary cathode follower fulfills this requirement adequately. For some applications, such as in measuring instruments, it is necessary that the high impedance of a particular circuit be not loaded to such an extent as to jeopardize its intended functioning while being coupled to another circuit. For this purpose it is necessary to improve upon the cathode-follower circuit by increasing its input impedance by decreasing its input shunt capacitance, usually indicated as $C_{in}$. The first step towards the solution of the problem of high input shunt capacitance has been undertaken by Keithly, who in his article "Stabilized decade-gain isolation amplifier," Electronics, April 1949, page 98, describes a method wherein the cathode of the cathode follower supplies a signal to another cathode follower which in turn drives the shield of the input lead in the same phase as the input signal. Since the gain of these cathode followers is appreciably less than unity, there is a small potential difference existing between the shield and the input lead. Hence, only a portion of the effect of the input shunt capacitance existing between the input lead and shield is canceled with this arrangement. Also, the problem of elimination of the capacitance existing between the grid and the plate of the cathode-follower tube still remains.

It is accordingly a general object of the present invention to provide a coupling circuit possessing a very high input impedance and a low output impedance.

It is an object of the invention to provide a circuit which has a low input shunt capacitance and conductance over a relatively wide range of frequencies.

Another object of the invention is to provide a circuit which will increase the gain of the cathode follower so as to reach unity amplification.

Still another object of the invention is to provide a circuit for decreasing the input shunt capacitance to such an extent as to present a negative input capacitance.

In order that the invention may be clearly understood and readily carried into effect, I shall describe the same in more detail with reference to the accompanying drawings, wherein.

Figure 1:
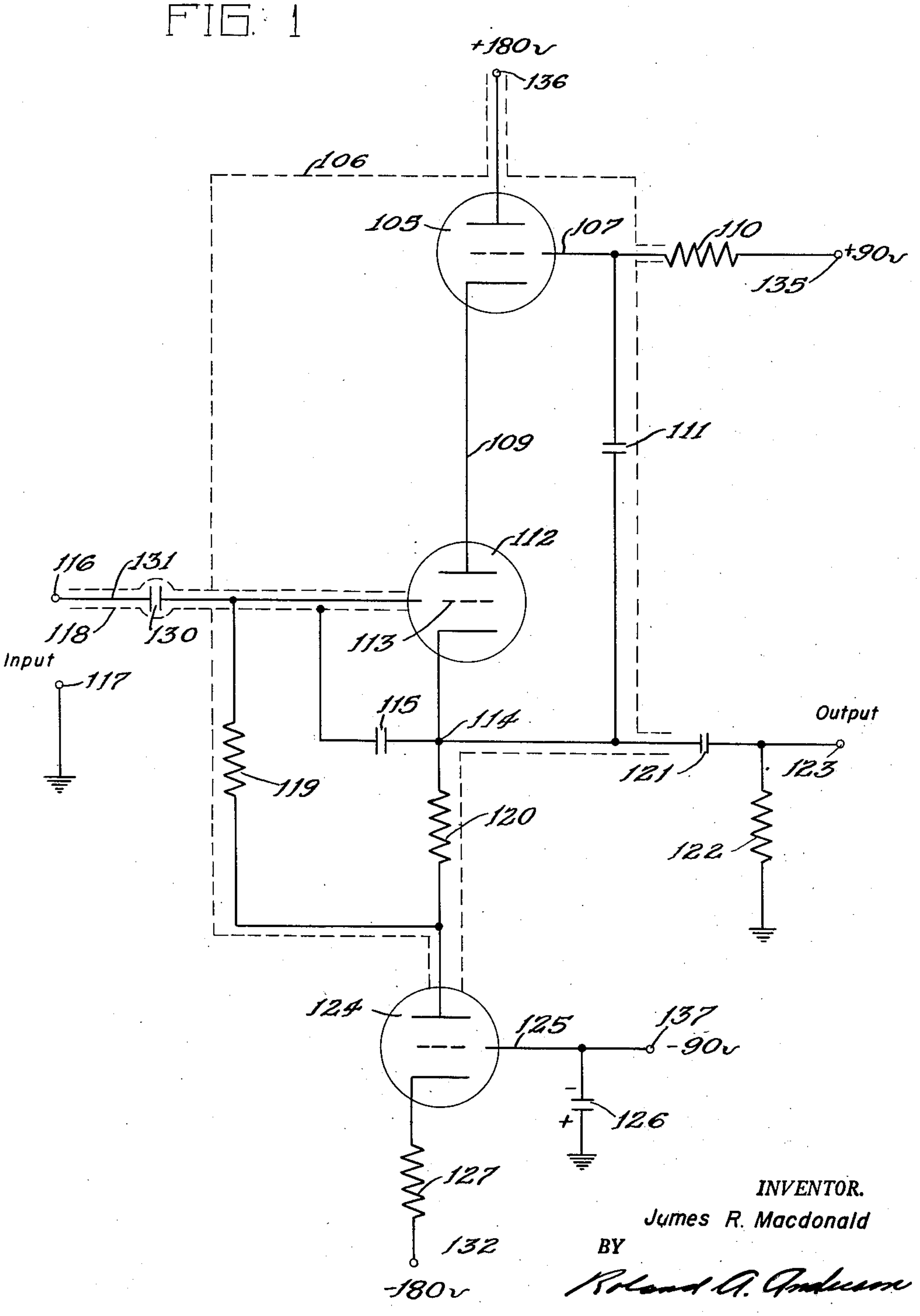
Figure 1 is a circuit diagram of a first embodiment of my invention.

Referring to Figure 1, the input side comprises a terminal 116 connected to a lead 131 coupled through a capacitor 130 to a grid 113 of a tube 112 used as a cathode follower. The other input terminal 117 is connected to ground. The input lead 131 together with its associated capacitor 130 is protected from deleterious effects of spurious electrical interferences by means of a shield 118. The cathode of the tube 112 is coupled to the shield 118 by means of a capacitor 115. The junction of the connection of the cathode and the capacitor 115 is indicated by a point 114. The cathode of the tube 112 is connected from the junction point 114 through a resistor 120 to a plate of another tube 124. The plate of tube 124 is connected to the grid 113 of the tube 112 via a resistor 119. The grid of the tube 124 is connected through a terminal 137 to a source of low negative potential, said terminal being shunted by a capacitor 126 to ground. The cathode of the tube 124 is connected through a resistor 127 and a terminal 132 to a source of high negative potential. The tube 124 together with the resistors 120 and 127 serves as a cathode load for the cathode-follower tube 112. The function of the tube 124 is to control the magnitude of the current flowing through the tube 112 so that at all times the magnitude of the current is essentially constant. The plate of the tube 112 is connected to a cathode of an additional tube 105. The grid of the tube 105 is connected through a resistor 110 to a source of low positive potential available at a terminal 135. The grid 107 is coupled through a capacitor 111 to the cathode of the tube 112. The cathode of tube 112 is also coupled through a capacitor 121 to an output terminal 123 which is shunted to ground by a resistor 122. The plate of the tube 105 is connected to a source of high positive potential available at a terminal 136. The two tubes 112 and 105 together with their mutual coupling capacitor 111, the capacitor 115 and the resistors 119 and 120 are shielded from stray electrical fields as well as other electromagnetic disturbances by means of a shield 106. The shield 106 is directly connected to the shield 118. The tube 105 serves to decrease the input capacitance $C_{in}$ by increasing the gain of the cathode-follower tube 112 to as near unity as possible and at the same time to reduce the capacitance $C_{gp}$ existing between the grid and plate of the tube 112.

The circuit as shown in Figure 1 operates in the following manner: When a signal is impressed across the input terminals 116 and 117, it is coupled through the capacitor 130 to the grid 113 of the tube 112. The voltage variations on the grid vary the internal impedance of the tube 112. The tube 124 together with the resistors 120 and 127 serve as a cathode load for the tube 112, which cathode load is equivalent to a very high impedance. The tube 105 which is connected in the plate circuit of the tube 112 also presents a high impedance. The operating condition of the tube 124 is kept essentially in a steady state by means of a steady bias impressed on grid 125 from the terminal 137. The voltage variation at point 114 is coupled through the capacitor 115 to the shield 118 to drive the shield 118 as well as the shield 106 in the same phase and substantially at the same amplitude as the input signal. Also, the voltage variation at point 114 is impressed on the grid 107 of the tube 105 through the capacitor 111 to drive the grid of the tube 105 in the same phase as the input signal which is impressed across the terminals 116 and 117. The driving of the grid 107 of the tube 105 presents a plate load to the tube 112 which is driven in same phase and voltage amplitude so that there is only a small voltage potential existing between the plate of the tube 112 and the grid 113. The effect of having a plate load of the cathode follower 112 driven in the same phase and amplitude is to decrease the component of the input shunt capacitance due to the interelectrode capacitance existing between the grid 113 and the plate 109 of the tube 112. The effect of driving the shield 118 in the same phase and amplitude as the input signal, which is impressed on the lead 131, is, similarly, to decrease the input shunt capacitance by decreasing the component due to the interelectrode capacitance existing between the grid 113 and the cathode of tube 112. The plate load described hereinbefore functions as a variable impedance which responds to the signal input in such manner that it assists the tube 112 to conduct in accordance with the signal input.

With three tubes 105, 112 and 124 connected in a series manner and with the outer tube 124 operating in a fixed state due to fixed bias impressed on its associated grid, most of the change in the series circuit will occur at the point 114. Signal voltage variations are removed from the point 114 and coupled to the output terminal 123 by way of the capacitor 121. A further reason why the capacitance existing between the grid 113 and the cathode of the tube 112 is decreased is due to the fact that the grid 113 is connected through the resistor 119 to the cathode of the tube 112 via the resistor 120.

Assuming for the moment that the signal impressed on the grid 113 is positive, the cathode of the tube 112 will follow suit and point 114 will also be positive. This positive voltage is coupled through the capacitor 111 to the grid 107 of the tube 105 resulting in an increased conduction of tube 105, or, in other words, in a decreased internal plate impedance of tube 105. Since the magnitude of the current flowing through the circuit is essentially constant because of the control exerted by the tube 124, the previous voltage distribution existing across the tubes 105 and 112 will have to be changed so that tube 112 will not exhibit a tendency to conduct more current due to presence of the positive signal. This is overcome by raising the potential at the point 114 so that original potential existing between the plate and the cathode of tube 112 is essentially preserved. The tube 105, which acts as a variable impedance in the plate circuit of tube 112, accomplishes this unique effect.

Figure 2:
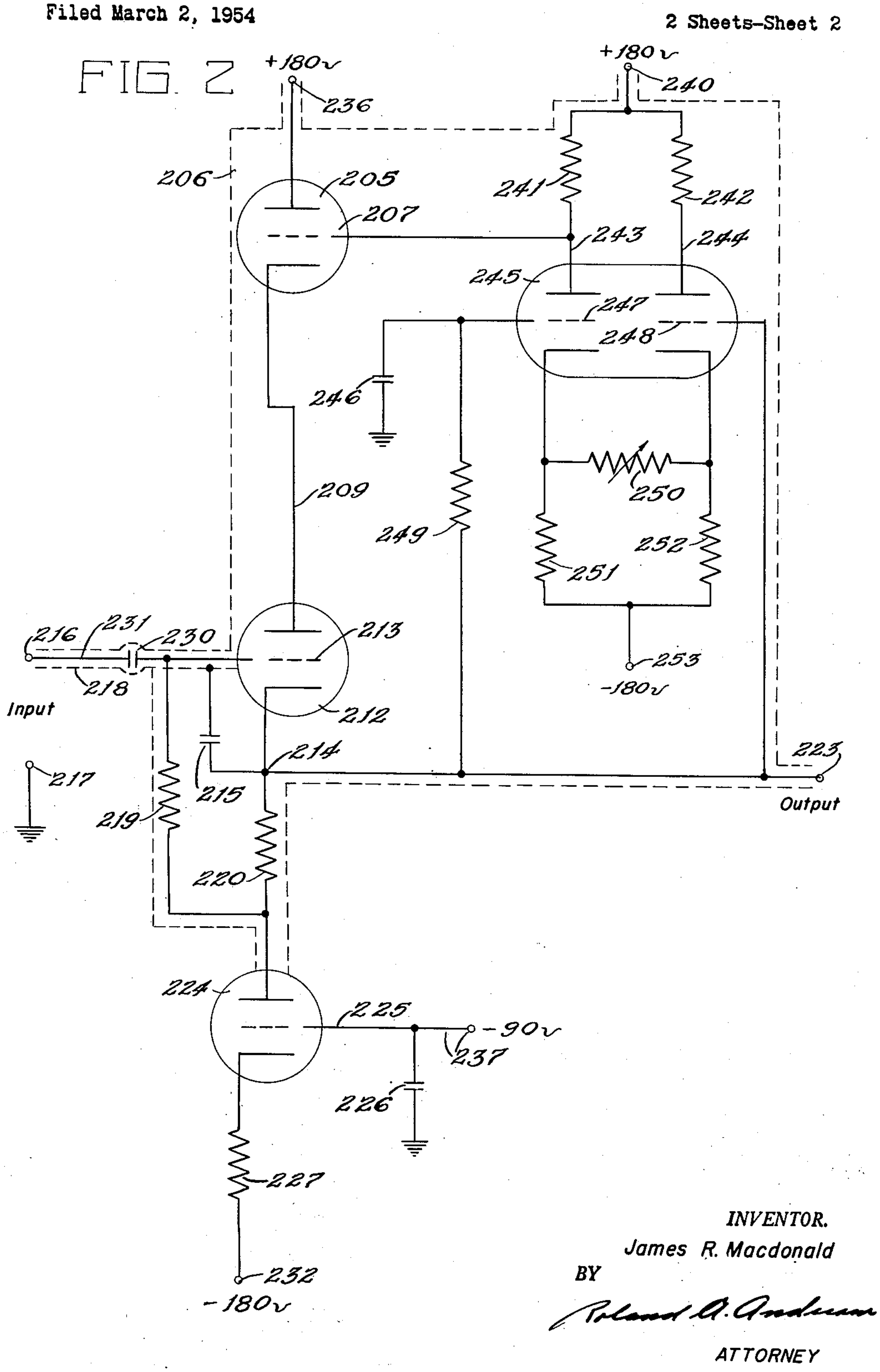
Figure 2 represents a circuit diagram of a second and preferred embodiment of my invention.

Referring to Figure 2, a circuit similar to the one shown in Figure 1 is shown with the exception that a differential amplifier circuit comprises tube 245 and its associated components has been added to that of the circuit previously disclosed. Input terminal 216 is connected to a lead 231, through a capacitor 230 to a grid 213 of a cathode-follower tube 212. The cathode of the tube 212 is coupled to a shield 218 surrounding the input lead 231 by way of a capacitor 215. The cathode of tube 212 is connected through a resistor 220 to a plate of another tube 224. The junction point of the resistor 220 and the plate of the tube 224 is connected through a resistor 219 to the grid 213 of the tube 212. The cathode load of the tube 212 comprises the resistor 220, tube 224 and a resistor 227 which connects the cathode of the tube 224 to a terminal 232. Tube 224 serves as a constant current supply for the circuit, this effect being achieved by impressing a constant potential from a terminal 237 on the grid 225 which is shunted to ground by a capacitor 226. The plate load for the tube 212 comprises a tube 205. The plate of the tube 212 is connected to the cathode of the tube 205. The plate of the tube 205 is connected to a terminal 236 which is connected to a source of positive potential. The differential amplifier circuit comprises a tube 245, it being a duplex triode. The cathodes of the tube 245 are connected individually through cathode resistors 251 and 252 to a terminal 253 which is connected to a source of negative power supply. The cathodes of the tube 245 are connected together by means of a variable resistor 250. Plates 243 and 244 of the tube 245 are connected individually through plate resistors 241 and 242, respectively, to a terminal 240 which is connected to a source of positive potential. The junction of the plate resistor 241 and the plate 243 is connected directly to the grid 207 of the tube 205. The grid 247 which is associated with the plate 243 of the tube 245 is shunted to a ground via a capacitor 246. Also, the grid 247 is connected to the cathode of tube 212 at the junction point 214 by way of a resistor 249. Grid 248 is connected directly to the junction point 214. The output of the circuit is removed from the junction point 214 over a line terminating in an output terminal 223. Variable resistor 250 is used for the purpose of achieving gain adjustment by varying the bias between the two cathodes of the tube 245. The tubes 205, 212 and 245 together with their associated components are enclosed in a shield 206 which is connected to the cable shield 218.

When at signal input is impressed across the terminals 216 and 217, the signal is passed through the capacitor 230 to the grid 213 of the tube 212. The voltage variation on the grid of tube 212 varies the internal impedance of the tube 212 with a similar resultant voltage variation at the junction point 214. The voltage variation at the junction 214 is impressed on the two grids of the twin triode 245, grid 248 being connected directly to the junction 214 and grid 247 connected by way of resistor 249 to the junction 214. Similarly, the voltage variation at the junction 214 is impressed across the capacitor 215 to the shield 218 surrounding the input lead 231. Application of the voltage variation at junction point 214 to the shield 218 causes the shield to be driven in the same phase and substantially in the same amplitude as the input signal, thereby decreasing the input capacitance and conductance existing between the grid 213 and the cathode of the tube 212 and also between the input lead 231 and the shield 218. Assuming for a moment that the signal input at the moment is of positive polarity, the voltage variation at the junction 214 will be similarly positive and will be impressed upon the two grids of the duplex triode 245. There will be however a difference in the voltage impressed on the grids because only one grid, namely 248 is connected directly to the junction 214 whereas the other grid 247 is connected through the resistor 249 which is shunted to the ground by the capacitor 246. Presence of positive voltage on grid 248 will cause the triode containing said grid to increase in conductance with a consequent voltage variation at the associated cathode connected to the junction of the variable resistor 250 and the resistor 252. This voltage change will be in the positive direction with the result that the cathode of the other half of the triode tube, said cathode being connected by means of a relatively low resistance 250 to the cathode of the triode tube containing the plate 244, will be affected in similar fashion; the result being that the conduction through the triode which has its plate 243 connected to the grid 207 of the tube 205 will be decreased, resulting in an increased positive potential on the plate 243. This increased positive potential being impressed on the grid 207 of the tube 205 will cause it to conduct in the same phase and in any desired amplitude (depending on the setting of resistor 250) as the signal input on the grid of the tube 212. It is understood that the increase of positive potential on plate 243 is not due entirely to the variation effected by the conduction of the other triode containing grid 248 because the effect of the coupled voltage variation on the grid 247 is to increase the conduction in its associated triode but to a lesser extent. It is only the difference between these opposing effects which is used to effect the ultimate output at the plate 243. By using the differential amplifier together in conjunction with the tube 205, it is possible to drive the plate of the tube 212 in phase with the input voltage but with greater amplitude. Adjustment of this amplitude by varying the gain is used to reduce the input capacity $C_{in}$ to zero or to make it negative. The amount of variation in the amplitude is obtained by the gain adjustment 250.

While there have been described what is at present considered to be several embodiments of the invention, it will be understood that various modifications may be made therein, and it is intended in the appended claims to cover all such modifications as found within the true spirit and scope of the invention.

What is claimed is:

1. A cathode follower circuit comprising a tube having a plate, a grid, and a cathode, a voltage source having positive and negative terminals, a variable impedance connected between the plate and the positive terminal, an impedance coupling the cathode to the negative terminal to maintain the current through the tube at a constant value, and means including a gain control connected to the variable impedance and the cathode for adjustably controlling the potential difference existing between the cathode and said last means, to thereby variably control the input and output imepdances in said tube.

2. An electronic circuit arrangement for decreasing the input shunt capacitance of a cathode follower stage utilizing a triode tube having a plate, grid and a cathode, said circuit comprising a power supply with positive and negative terminals, second and third tubes having similar electrodes, the plate of the first tube connected to the cathode of the second tube and the plate thereof connected to the positive terminal, an impedance coupling the cathode of the first tube to the plate of the third tube, the cathode of the third tube being connected to the negative terminal, a shielded input lead connected to the grid of the first tube for transmitting a signal voltage thereto, the cathode of the first tube coupled to the shield of the input lead to impress a driving voltage thereon, an amplifier comprising a duplex triode having its plates and cathodes connected across the power supply, the cathode of the first tube coupled to the grids of said duplex triode to impress a signal thereon, a gain control connected between the duplex cathodes to vary signal input potential therebetween, means connected to the cathode of the first tube to provide an output, the grid of the second tube connected to one of the plates of said duplex triode, said amplifier responsive to signal voltage variation at the cathode of the first tube to drive the grid of the second tube in such phase and magnitude that the plate of the first tube follows the potential of the grid of the first tube whereby the grid to plate capacitance of the first tube may be decreased to zero.

References Cited in the file of this patent

UNITED STATES PATENTS 2,592,193 Saunders ---------------- Apr. 8, 1952

OTHER REFERENCES

Burton: abstract of application Serial No. 120,667, published Nov. 18, 1952, 664 O. G. 960.